Dec. 10, 1968

M. ALLEN 3,416,128

ELECTRODE FOR ELECTROHYDRAULIC SYSTEMS

Filed Oct. 14, 1966

Inventor:
Merton Allen, by Richard A. Speer

His Attorney.

3,416,128
ELECTRODE FOR ELECTROHYDRAULIC
SYSTEMS
Merton Allen, Schenectady, N.Y., assignor to General
Electric Company, a corporation of New York
Filed Oct. 14, 1966, Ser. No. 586,861
2 Claims. (Cl. 340—12)

ABSTRACT OF THE DISCLOSURE

An electrode construction adapted for use in an electrohydraulic system in which shock waves in a substantially incompressible dielectric liquid are produced by arc discharges between terminals of the electrode which are submerged in the liquid. The electrode is characterized by a rod-like, axially movable high voltage rod having an insulating outer coating, and a rod-like ground potential arcing member resiliently and rotatably mounted with its axis lying in a plane containing the axis of the high voltage rod, the two axes being substantially perpendicular to each other, both members being supported by a ground potential body.

---

This invention relates to electrode constructions and more particularly to a more rugged and simplified electrode construction for use in electrohydraulic systems in which shock waves are produced repeatedly in liquid media by means of high voltage arc discharge.

Electrohydraulics is a technology which is concerned broadly with the creation or generation of shock waves in liquid media by means of electric arc discharge in the liquid and therefore to the apparatus and methods for creating and utilizing the shock waves. The technology may, in a broad sense, be viewed as one in which electrical energy is converted to physical or mechanical energy, the latter form of energy being then directly applicable to various types of manufacturing and processing operations. More particularly, the physical energy takes the form of a shock wave or steep pressure gradient that is transmitted from its point of origin, the electric arc of a submerged electrode, through the fluid surrounding the electrode. The energy of the wave is great enough to effect deformation of heavy gauge metals and is adaptable to such diverse applications as metal forming, rock crushing, cleaning and geodetic surveying, for example. Since many of these types of operations require fast, repeated electrode discharge and in view of the fact that the electrode is immersed in the work liquid, it is apparent that the electrode must be capable of withstanding demanding operating conditions for long discharge cycles.

It is a principal object of this invention to provide an improved electrode for use in electrohydraulic systems which is more simply constructed and more rugged than previously existing electrodes.

A further object of this invention is to provide an electrode for use in electrohydraulic systems in which the arcing portions of the high voltage and ground parts are spaced directly opposite along a line extending through the axis of the high voltage electrode. The high voltage electrode can be an anode or a cathode depending upon whether the high voltage DC potential is positive or negative, respectively, with respect to ground potential.

Other objects and advantages of this invention will be in part obvious and in part explained by reference to the accompanying specification and drawings.

Figure 1:
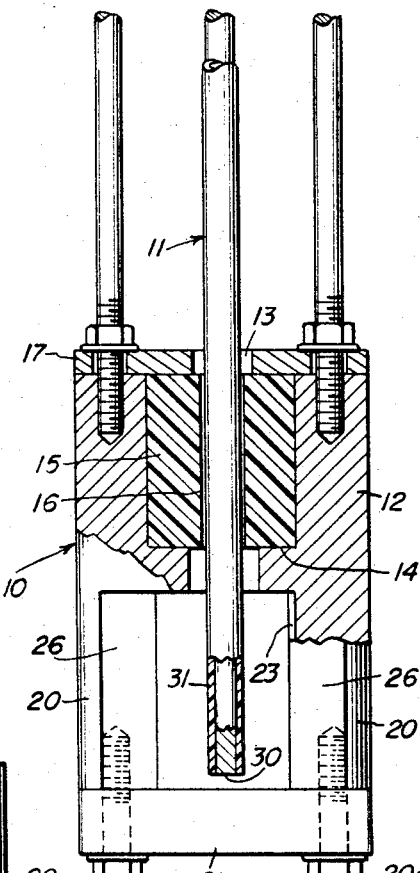
FIG. 1 is a side elevation of an electrode according to this invention with parts broken away for clarity.

Generally, the present electrode construction comprises a ground potential portion which includes a body portion having an axial opening extending through it and having a plurality of extensions depending from one end of the body portion. An electrically insulating bushing is mounted within the axial opening of the body portion and itself has an axial opening extending therethrough. A ground bar or rod constituting the arcing portion of the ground potential member extends across a pair of the body portion extensions in a fashion such that the common axis of the openings in the body portion and in the insulating bushing passes normally through the ground bar or rod. The electrode also has an elongated high voltage rod which is mounted for axial movement toward and away from the ground bar or rod and which extends through the opening in the insulating bushing. The arcing end of the high voltage rod is located operably adjacent the ground bar so that arcing is effected in a direction substantially parallel to the axis of the high voltage rod.

Referring to the drawings to explain the construction of the electrode more fully, numeral 10 indicates generally the ground potential portion of the electrode and numeral 11 the high voltage portion which extends axially through the ground potential portion. Turning first to a discussion of the ground potential portion 10, it will be noted that it is made up of a body portion 12 which is of generally circular cross-sectional configuration and which has an axially extending opening 13 passing through it. The diameter of the axial opening 13 varies so that a shoulder 14 is provided to aid in retaining an electrically insulating bushing 15, the bushing in turn having an axial opening 16 extending through it. The bushing may alternately be retained by an internal snap ring inserted into a groove in body portion 12, in place of the shoulder 14. Bushing 15 is retained in position by means of bushing retaining plate 17.

Figure 3:
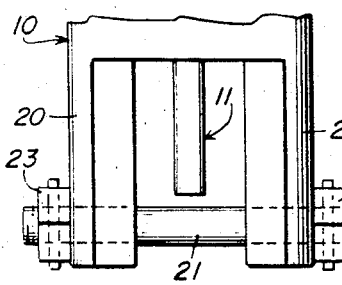
FIG. 3 is a fragmentary side elevation showing an alternative construction for the electrode arcing portion.
Figure 4:
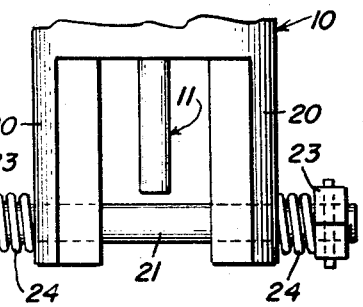
FIG. 4 is a view like FIG. 3 showing a still further modification.
Figure 2:
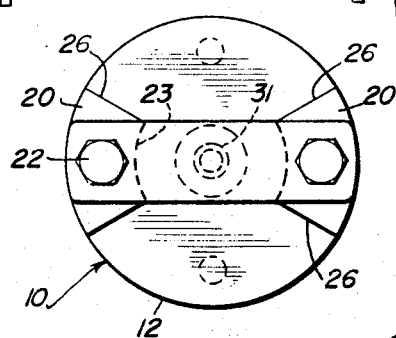
FIG. 2 is a bottom elevation of the electrode.

Body portion 12 also includes a plurality of extensions 20 which depend from one end, shown as the bottommost end as viewed in FIG. 1 of the drawings. These extensions run parallel with the axis of the body portion 12 and with the common axis of the opening 13 and 16. Extending across the ends of the extensions 20 is a ground arcing member (bar or rod) 21 here shown attached to outer ends of the extensions by means of bolts 22. The ground arcing member 21 can be rectangular, circular, oval or other cross-sectional shape and can be attached to the extensions 20 in some other manner than by bolts 22. FIGS. 3 and 4 show alternate ways to attach the ground arcing member 21 to extensions 20.

In the construction shown in FIG. 3, the ground arcing member 21 is rigidly attached to the extensions 20 by means of threaded fasteners 23 which are pinned to prevent them from loosening during operation of the electrohydraulic apparatus. The construction shown in FIG. 4 differs from that of FIG. 3 in that the ground arcing member 21 is mounted on the extensions 20 in such a way that it is free to rotate. This freedom of rotation is obtained by placing springs 24 on the arcing member between the outer wall of the extensions and the retaining nuts 23 mounted on each end of arcing member 21. This construction has been found to be extremely effective since arcing between the high voltage rod 11 and the ground arcing member 21 is not always perfectly centered. Thus, when an arc strikes the ground arcing member, a torque force is generated which often is great enough to sheer the arcing member and require its replacement. Freedom to rotate eliminates this problem and assures longer, more dependable operation of the electrode.

The ground arcing member 21 extends across the pair of extensions 20 in a fashion such that the common axis of the openings 13 and 16 passes normally through the ground arcing member. Although the ground arcing member need not be removably attached to the extensions, the construction is a preferred one since it provides for easy replacement of the ground arcing member after some extended period of use. It should be noted that the extensions 20 are shaped with arcuate inner surfaces 23 and that the side walls 26 also diverge from the center at some preselected angle. This particular construction is given only by way of example to illustrate one means in which the extensions may be shaped to direct the shock wave resulting from arcing in a preselected direction. Other configurations can be used and more than two extensions 20 may also be present.

The other portion of the overall electrode is the high voltage rod 11 which, as indicated, is of elongated construction and extends parallel to the axis of the openings 13 and 16. The high voltage rod 11 is maintained for axial movement by any suitable means (not shown) so that its lower arcing end 25 can be moved toward the adjacent surface of ground arcing member 21. The high voltage rod 11 may be constructed of any suitable metal such as aluminum, stainless steel, iron, brass, copper, or alloys of these or other metals, as can be the ground arcing member 21. The outer surface 31 of the high voltage rod 11 is an electrically insulating coating which is consumed in the arc discharge gap at substantially the same rate as the metal core is consumed. Glass-epoxy materials or resin glasses constitute suitable materials for this purpose. It is important that the consumption of the insulating material closely approximate that of the metal core so that the metal end 30 of the high voltage rod will not be unduly exposed so that the arc will be forced to occur in the gap between the metal end 30 of the high voltage rod and the ground arcing member 21. It is of significant importance that the high voltage-ground working faces are in opposed configuration since it enables better control of the discharging characteristics of the electrode. Since erosion of the arcing surface occurs continuously during operation, accurate control of the arc discharge length or gap is necessary for effective operation of the device. The optimum gap is one characterized by a short ionization period followed by a marked voltage drop to zero in a short time interval. An oversized gap is characterized by a long ionization time with a commensurate reduction in voltage before arcing and voltage drop to zero is effected. By way of comparison, an undersized gap results in an oscillatory discharge. Obviously, the initial gap is dependent upon such things as the conductivity of the fluid medium, the diameter and shape of the high voltage rod arcing end and the electric characteristics of the discharge sought.

An electrode constructed in the manner illustrated by the figures of the drawings was constructed and fired continuously in water having about 2000 ohm-centimeters resistivity at voltages up to 15 kv. and capacitance up to 95 microfarads. At 27 microfarads and 13 kv. at a rate of two discharges per second, with the high voltage rod 11 made anodic with respect to ground potential, the electrode was fired for a total number of 30,000 discharges at a starting gap of 0.250 inch. The erosion rate of the center high voltage rod at this condition was such that from 400 to 500 discharges were possible per 0.100 inch growth in gap, at which time the high voltage rod was advanced to reset the gap to its starting dimension. At other conditions the advanced rate could vary from less than 100 discharges to more than 1000 discharges per 0.100 inch advance. In this construction Everdur 1010 was the conductor with a ¼" diameter and a ¼" I.D. x ½" O.D. epoxy-glass tubing outer layer. The insulating bushing was made of a material having the ability to absorb and withstand the shock wave without damage. Polyethylene, nylon, Teflon and hard rubbers were all tried and found to be suitable.

The present electrode construction by providing an axially moving high voltage rod and a simplified ground construction makes it possible to continuously and accurately maintain a preselected arcing gap so that optimum operating characteristics of the electrohydraulic apparatus can be maintained at all times. The simplicity of construction is significant in assuring ruggedness in operation since few parts are present to become distorted or otherwise out of operating condition.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An improved electrode construction for use in an electrohydraulic system to produce repeated shock waves in a liquid medium, said electrode comprising:
   (a) a ground potential portion including:
      (1) a body portion having an axial opening extending therethrough and having a plurality of extensions depending from one end thereof,
      (2) an electrically insulating bushing composed of an organic polymeric material mounted within the axial opening within said body portion and itself having an axial opening extending through it, and
      (3) a generally cylindrically shaped ground arcing member extending across a pair of the body portion extensions in a fashion such that the axis of the openings in said body portion and said insulating bushing pass normally through said ground arcing member, said ground arcing member being resiliently supported by said extensions in a manner permitting said member to rotate with respect to said extensions and
   (b) an elongated axially moveable high voltage rod extending through the opening in said electrically insulating bushing and positioned with one end operatively adjacent said ground arcing member so that arcing is effected therebetween in a direction substantially parallel to the axis of said high voltage rod, the outer surface of said rod being provided with an electrically insulating coating comprising inorganic fibers bonded together by an organic polymeric material which erodes in use at substantially the same rate as the rod.

2. An electrode as defined in claim 1 wherein said body portion extensions are provided with divergent substantially planar portions interconnected by arcuate inner surfaces to direct the shock wave resulting from arcing between the high voltage rod and the ground arcing member in a preselected direction.

References Cited

UNITED STATES PATENTS

| | | | |
|---|---|---|---|
| 1,286,123 | 11/1918 | Savage | 313—125 X |
| 1,318,529 | 10/1919 | Berlioz | 313—122 X |
| 2,028,896 | 1/1936 | Brinker | 313—143 X |
| 2,106,449 | 1/1938 | Boyd | 313—143 X |
| 2,597,718 | 5/1962 | Field | 313—122 X |
| 3,099,813 | 7/1963 | Anderson | 340—12 |
| 2,135,297 | 11/1938 | Vila | 313—122 |
| 3,251,027 | 5/1966 | Huckabay et al. | 340—7 X |

RODNEY D. BENNETT, *Primary Examiner.*

BRIAN L. RIBANDO, *Assistant Examiner.*

U.S. Cl. X.R.

340—7